(12) United States Patent
Olson

(10) Patent No.: US 7,469,914 B2
(45) Date of Patent: Dec. 30, 2008

(54) CONTROL SYSTEM FOR MOTORCYCLE FORK

(75) Inventor: Jody L. Olson, Knoxville, TN (US)

(73) Assignee: Aircell Engineering, Inc., Maryville, TN (US)

(*) Notice: Subject to any disclaimer, the term of this patent is extended or adjusted under 35 U.S.C. 154(b) by 442 days.

(21) Appl. No.: 11/195,012

(22) Filed: Aug. 2, 2005

(65) Prior Publication Data

US 2006/0027989 A1 Feb. 9, 2006

Related U.S. Application Data

(60) Provisional application No. 60/599,745, filed on Aug. 6, 2004.

(51) Int. Cl.
  B60G 11/00 (2006.01)
  B62K 21/20 (2006.01)
  F16F 9/43 (2006.01)

(52) U.S. Cl. .................. 280/124.158; 280/124.104; 280/276; 188/322.21; 188/266.1

(58) Field of Classification Search ..... 74/551.1–551.4; 180/219; 188/275, 322.21, 266.1, 280; 280/124.16, 280/124.104, 124.157, 124.158, 275, 276
See application file for complete search history.

(56) References Cited

U.S. PATENT DOCUMENTS

| 1,836,381 | A | | 12/1931 | McNab | |
|---|---|---|---|---|---|
| 4,153,266 | A | | 5/1979 | Uhls | |
| 4,159,106 | A | * | 6/1979 | Nyman | 267/64.15 |
| 4,437,678 | A | * | 3/1984 | Schultz | 280/276 |
| 4,524,844 | A | * | 6/1985 | Williams, Jr. | 180/219 |
| 4,609,202 | A | * | 9/1986 | Miyakoshi et al. | 280/276 |
| 4,732,244 | A | * | 3/1988 | Verkuylen | 188/318 |
| 4,735,276 | A | | 4/1988 | Burton | |
| 6,026,939 | A | | 2/2000 | Girvin et al. | |
| 6,086,060 | A | * | 7/2000 | Berthold | 267/64.15 |
| 6,095,541 | A | | 8/2000 | Turner et al. | |
| 6,105,987 | A | | 8/2000 | Turner | |
| 6,213,263 | B1 | * | 4/2001 | De Frenne | 188/318 |
| 6,244,398 | B1 | | 6/2001 | Girvin et al. | |
| 6,311,961 | B1 | | 11/2001 | Julia | |
| 6,415,895 | B2 | | 7/2002 | Marking et al. | |
| 6,581,948 | B2 | * | 6/2003 | Fox | 280/276 |
| 6,592,136 | B2 | | 7/2003 | Becker et al. | |

(Continued)

FOREIGN PATENT DOCUMENTS

| GB | 734.097 | | 7/1955 |
|---|---|---|---|
| GB | 2176753 A | * | 1/1987 |
| WO | WO 88/03493 | | 5/1988 |
| WO | WO 00/35686 | | 6/2000 |

Primary Examiner—Paul N. Dickson
Assistant Examiner—Marc A Scharich
(74) Attorney, Agent, or Firm—Luedeka, Neely & Graham PC

(57) ABSTRACT

A ride control system for a motorcycle having an oil-containing fork having an air space. The control system includes a control unit having a reservoir and a valve in flow communication with the air space of the fork and the reservoir. The valve is configured to enable air to substantially freely pass from the air space of the fork to the reservoir during a relatively low speed impact experienced by the fork, and to inhibit air from passing from the fork to the reservoir during a relatively high speed impact.

11 Claims, 6 Drawing Sheets

U.S. PATENT DOCUMENTS 6,722,678 B2 * 4/2004 McAndrews ................ 280/285
7,140,601 B2 * 11/2006 Nesbitt et al. ............ 267/64.13
7,284,766 B2 * 10/2007 Temmerman et al. ....... 280/275
2004/0020730 A1 2/2004 Turner

* cited by examiner

CONTROL SYSTEM FOR MOTORCYCLE FORK

CROSS-REFERENCE TO RELATED APPLICATION

This application claims benefit to U.S. Provisional Application Ser. No. 60/599,745 filed Aug. 6, 2004, and entitled "Control System For Motorcycle Fork," incorporated herein by reference in its entirety.

FIELD OF THE INVENTION

This invention relates generally to shock absorption devices for vehicles. More particularly, this invention relates to a control system for enabling control over the shock absorption characteristics of a motorcycle fork.

BACKGROUND AND SUMMARY OF THE INVENTION

Motorcycles used for off-road racing or riding typically utilize oil-containing forks designed to absorb large impacts such as may be encountered during off-road racing or riding. However, providing for high impact events often leaves undesirable performance characteristics, such as a bumpy, harsh ride, when relatively small impact events are encountered. Typically, each front fork is a shock absorber provided by an enclosed cylinder having valving shims (or disks), a spring, oil and air space. A harder ride is achieved by minimizing the air space, while a softer ride is achieved by maximizing the air space.

The disclosure relates to a ride control system for a motorcycle having an oil-containing fork having an air space. In a preferred embodiment, the control system includes a control unit having a reservoir and a valve in flow communication with the air space of the fork and the reservoir. The valve is configured to enable air to substantially freely pass from the air space of the fork to the reservoir during a relatively low speed impact experienced by the fork, and to inhibit air from passing from the fork to the reservoir during a relatively high speed impact. This advantageously preserves desired shock absorbing characteristics for heavy shock absorption events, e.g., bumps at high speed, while still providing desired cushioned ride characteristics during low speed riding. This provides improved rider comfort and can help eliminate fork shaking, commonly referred to as head-shake, and other disadvantages associated with riding motorcycles having shock devices adjusted to withstand relatively hard impacts.

For example, an off-road racer or rider will typically adjust the fork to a setting corresponding to the hardest anticipated impact, such as a major jump, on the course or trail. This adjustment may be accomplished as by adding oil to the fork or adding a stiffer spring. Assuming a relatively hard impact is expected, this leaves the fork ill-suited for the remainder of the course as the fork is too stiff. The systems described herein advantageously provide a fork system that permits a rider to adjust the fork to a setting corresponding to the hardest anticipated impact, yet the fork is better suited for the remainder of the course that does not have such hard impacts. Thus, a rider utilizing a fork utilizing such a control system can experience improved comfort and control through the remaining portions of the course as compared to use of a fork not having such a control system.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
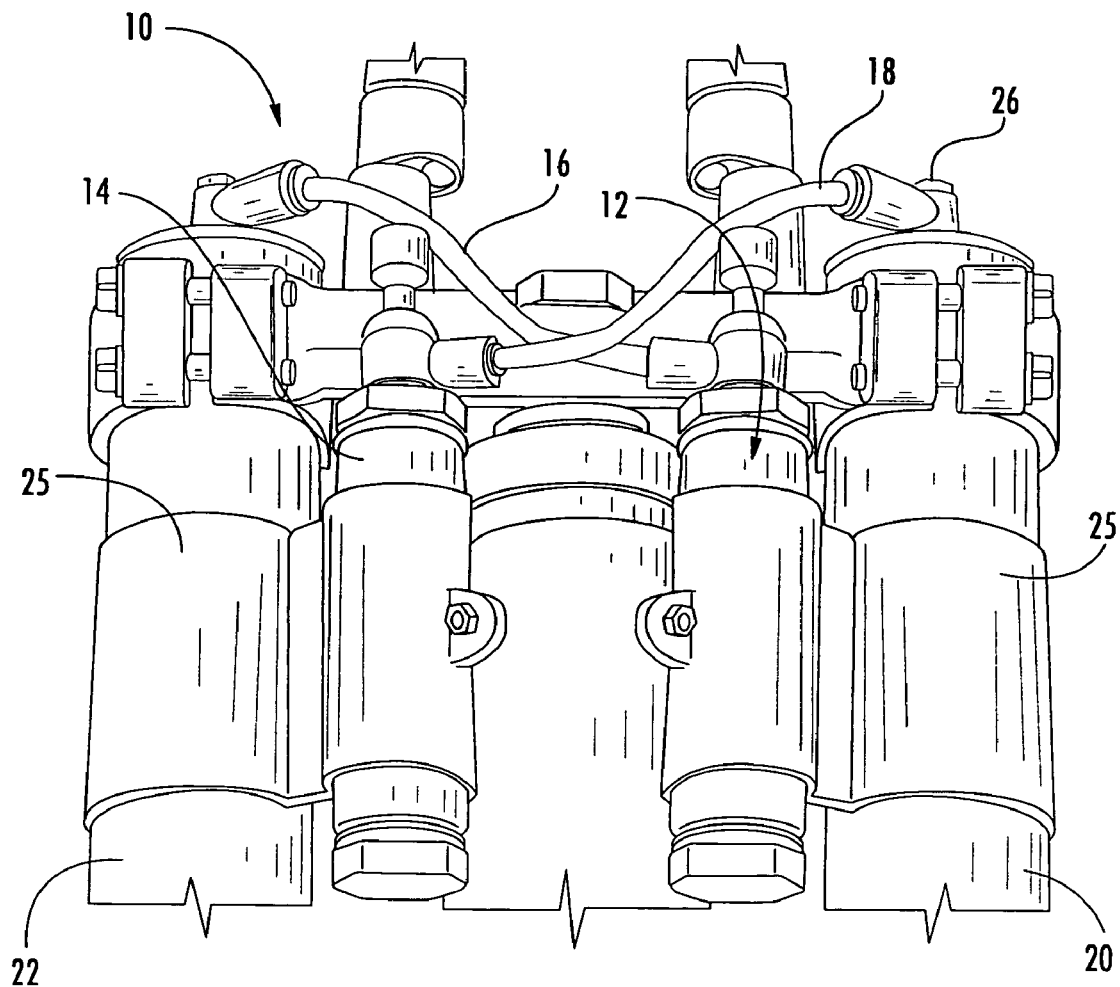
FIG. 1 is a frontal view of a fork control system installed on a motorcycle fork in accordance with a preferred embodiment.
Figure 2:
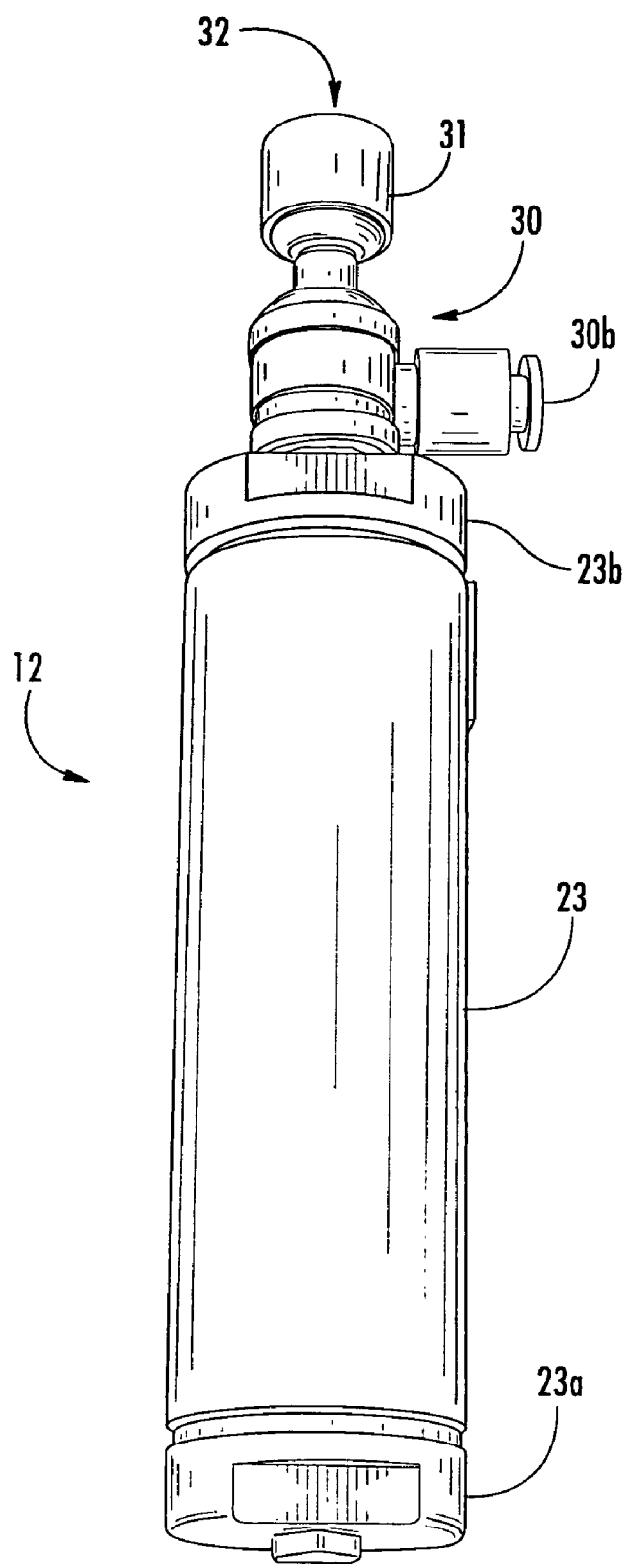
FIG. 2 shows a control unit component of the system of FIG. 1.
Figure 3:
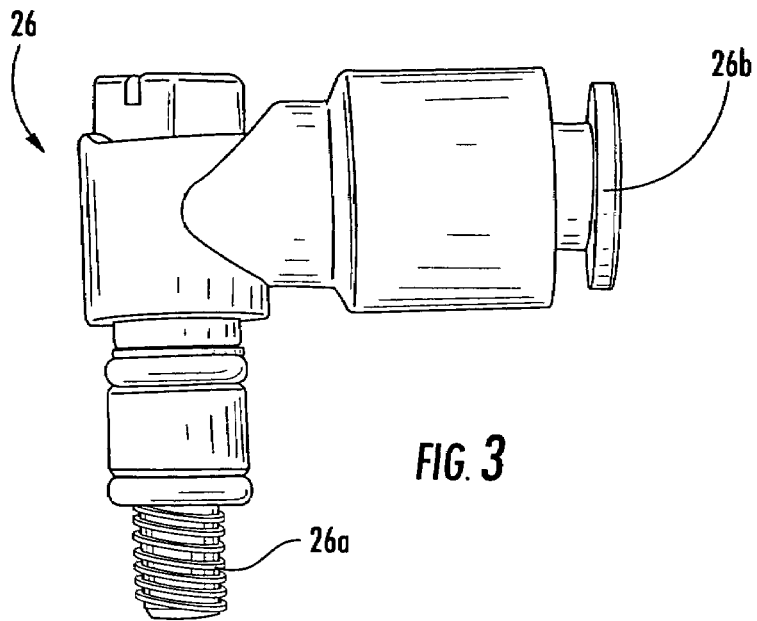
FIG. 3 is a detailed side view of a fitting component.
Figure 4:
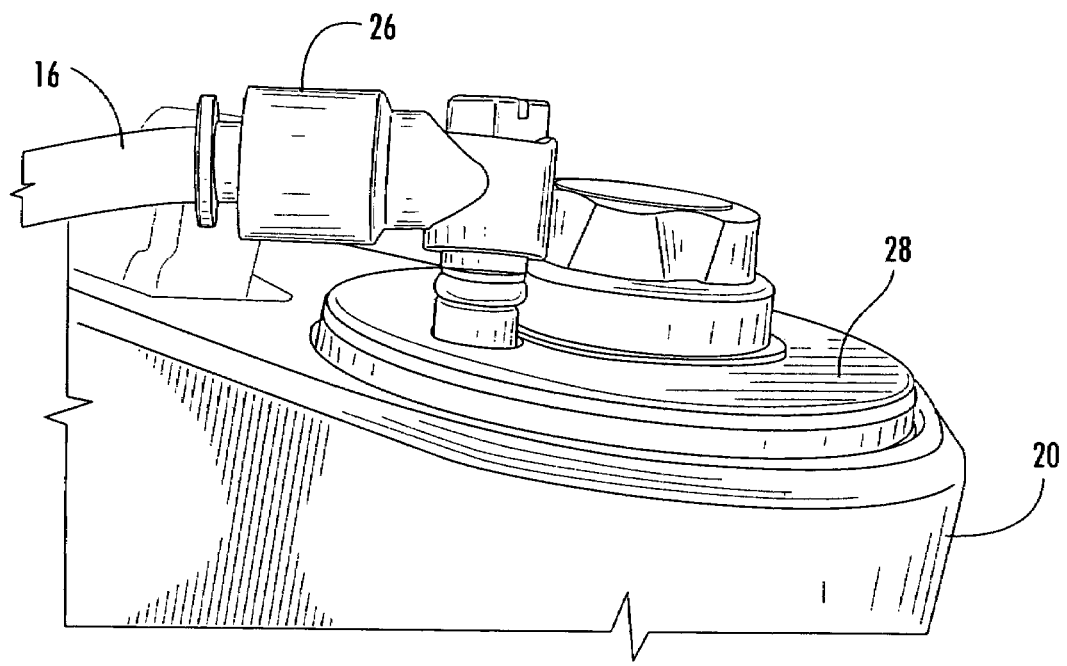
FIG. 4 shows the fitting of FIG. 3 installed on the cap of a motorcycle fork and having tubing connected thereto.
Figure 5:
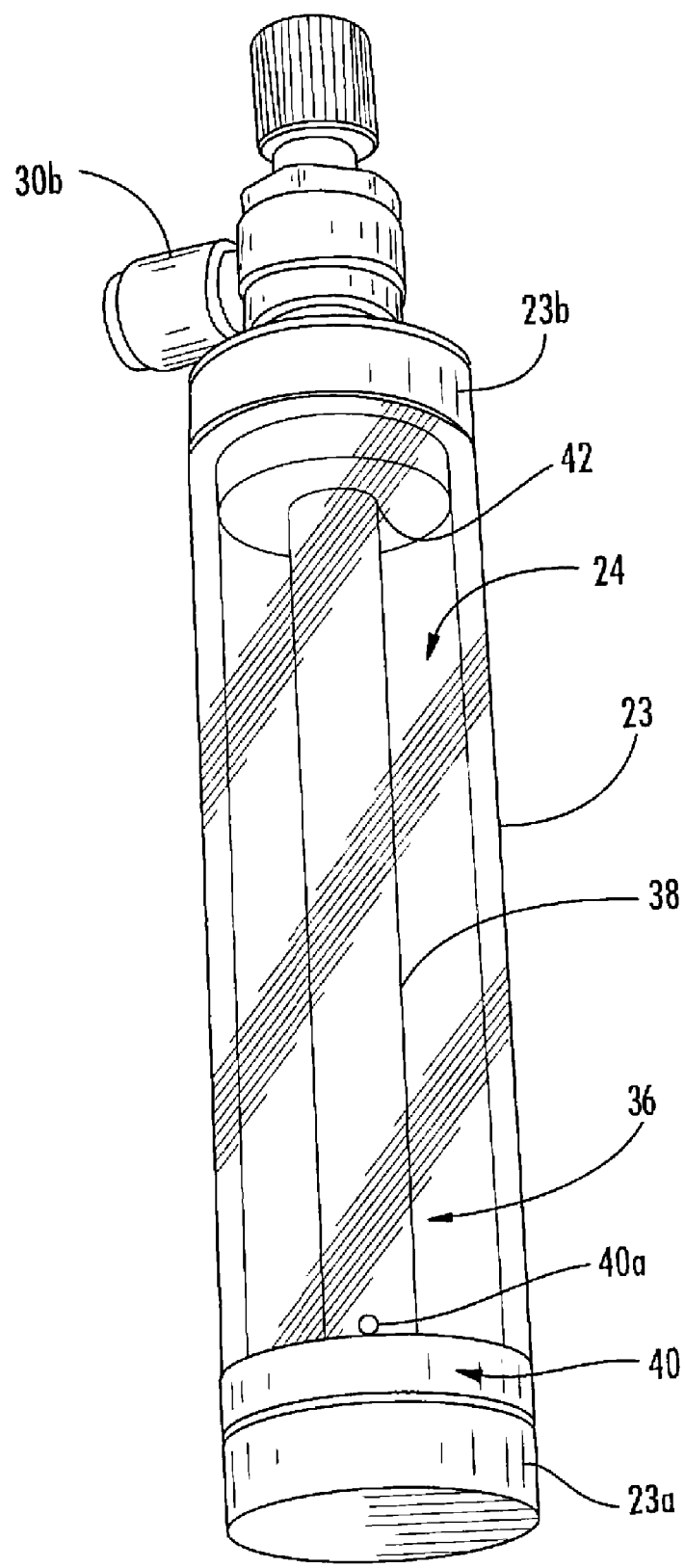
FIG. 5 illustrates interior features of the control unit of FIG. 2.

With reference to FIGS. 1-5, there is shown aspects of a fork control system 10 in accordance with a preferred embodiment. The system 10 preferably includes a pair of control units 12 and 14 connectable as by high pressure tubing 16 and 18 to suspension forks 20 and 22 of a motorcycle. The control units 12 and 14 are preferably identical to one another, as are the tubing 16, 18 and the forks 20 and 22 to one another, respectively. Accordingly, it will be understood that the following description of the control unit 12 also corresponds to the construction of the unit 14 and its relation to the tubing 18 and fork 22.

The control unit 12 includes a cylinder 23 defining a reservoir 24 in flow communication with the fork 20 via the tubing 16. The control unit 12 is preferably made of stainless steel and includes aluminum end caps 23a and 23b at the opposite ends thereof. Each cylinder 23 preferably has an internal diameter of about 1.25 inches, with a volume of about 50 cc.

The control unit 12 is adjustably operable to increase the air volume of the fork during low speed events (to provide a more cushioned ride), but to have the fork retain a reduced air volume during high impact events, such as when hitting a bump at high speed (to absorb more shock). The control units are preferably mounted to the forks as by use of mounting brackets 25 or the like which clamp around the control unit and the fork.

A fitting 26 is provided on an upper cap 28 of the fork 20 for connection of one end of the tubing 16. The fork 20 and the cap 28 may be represented as by a conventional oil-containing fork having a cap vent screw threadably received in a threaded aperture defined through the cap. Such cap vent screws are typically supplied for periodically bleeding off pressure that may build up in the fork during use. Thus, conventional oil-containing forks may be retro-fit to include the features of the invention with relative ease. For example, the fitting 26 provides a flow path between ends 26a and 26b thereof, with the end 26a preferably being threaded to be received by the threaded aperture provided in the cap 28 for the cap vent screw and the end 26b configured for connection of the tubing 16.

An adjustable air compression damping valve 30 is provided on the control unit 12 and extends through the cap 23b. The valve has a flow end 30a that extends through the cap 23b and an opposite flow end 30b that is connectable to the tubing 16. The tubing 16 extends from the fitting 26 on the fork 20 connects to the valve 30 to place the reservoir 24 and the fork 20 in flow communication. By adjustment of the valve 30, control over the degree of stiffness or resistance of the fork 20 may be achieved. That is, the valve 30 may be adjusted to change the flow of air that can be passed to the reservoir during an impact event. For example, by adjusting the valve to reduce the available air flow path through the valve, the less impact will be required for the valve to inhibit flow of air to the reservoir, thus yielding a stiffer response. By adjusting the valve to increase the available air flow path through the valve, the more impact will be required for the valve to inhibit flow of air to the reservoir, thus yielding a softer response.

The valve 30 enables control over the flow rate of air traveling from the fork 20 to the reservoir. The valve 30 may also preferably include an unregulated and internally located check valve such that reverse air flow, e.g., air flow from the reservoir to the fork, is unrestricted for return of air to the fork. The valve 30 preferably includes a rotatable knob 31 that may be rotated to adjust the air flow path allowed by the valve between the ends 30a and 30b. For example, the valve may include an aperture that may be variably blocked by rotation of the knob 31. A spring-loaded push button vent 32 is preferably included on the top of the knob 31 to enable pressure to be vented, such as pressure that might build up in the fork 20. That is, the vent 32 may be depressed to open a vent orifice to enable pressure to escape via the valve 30. A preferred valve 30 is prepared by modifying a stock valve as described below in connection with FIGS. 7-10.

Preferred tubing for providing the tubing 16 and 18 is nylon tubing having an internal diameter of about 4 mm, and outer diameter of about 6 mm, and pressure rated for 220 psig.

The control member 12 also preferably includes an oil return assembly 36 located within the reservoir 24 and preferably provided by a conduit 38 having one or more apertures 40a at a lower end 40 and an opposite upper end 42 in flow communication with the fork 20 via the valve 30 and tubing 16. It has been observed that during use of the fork 20, oil from the fork will tend to migrate into the reservoir 24. The oil is returned to the fork via the return assembly 36, with the rebound stroke of the fork providing a negative pressure to draw the oil back to the fork from the reservoir via the assembly 36.

In preparation for use, the forks are each initially filled with a higher than normal volume of oil and, in operation, the control units function to allow air to pass from the forks to their respective associated reservoirs during a low speed impact and to inhibit or restrict air passage from the fork to the reservoir during a high speed impact. For example, in the event of a low speed impact, the air in the fork 20 is compressed slowly and the valve 30 is able to substantially freely pass the air from the fork 20 to the reservoir 24. This provides a shock absorbing response by the fork corresponding to the fork having a relatively large air space therein. The one-way check valve enables the air to return to the fork as the pressure equalizes. During a high speed impact, the air in the fork is compressed rapidly and the control valve is not able to pass this high volume and velocity of air into the reservoir as quickly. Thus, passage of air from the fork to the reservoir is substantially inhibited during the high speed impact event. This provides a shock absorbing response by the fork corresponding to the fork having a relatively small air space therein.

Figure 6:
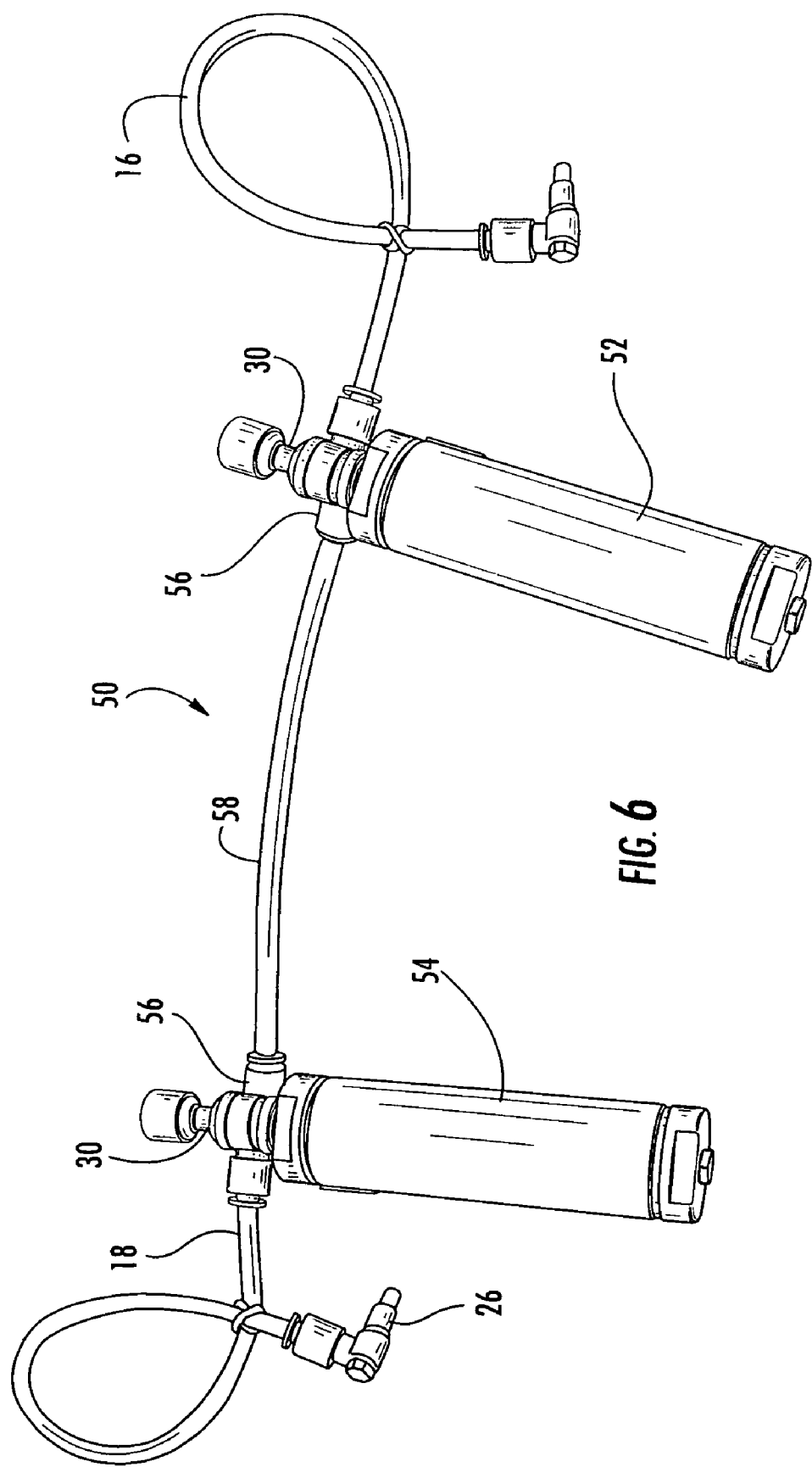
FIG. 6 shows an alternate embodiment of a fork control system.

With reference to FIG. 6, there is shown an alternate embodiment of a fork control system 50. The system includes a pair of control units 52 and 54, each connectable as by the tubing 16 and 18 and the fittings 26 to a fork, such as the forks 20 and 22. The control units 52 and 54 are preferably substantially similar to the control units 12 and 14 and include the valves 30, except each includes an additional fitting 56 having an interior port in direct flow communication with the reservoir of the control unit, such as the reservoir 24 of the control unit 12. Each fitting 56 also includes an exterior port in flow communication with the interior port. The exterior ports of the fittings 56 of the control units 52 and 54 are placed in flow communication with one another by tubing 58 extending therebetween. In this manner, the reservoirs of the control units are maintained in flow communication such that any pressure differences occurring therebetween during riding may be quickly equalized. The fittings 56 may substantially correspond to the fittings 26 in construction.

Figure 7:
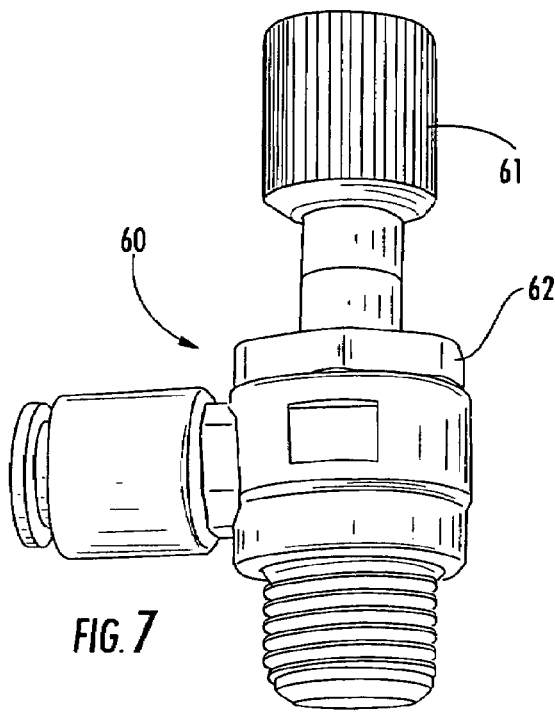
FIGS. 7-10 show a stock valve and modification thereof for use in the control unit of FIG. 2.
Figure 8:
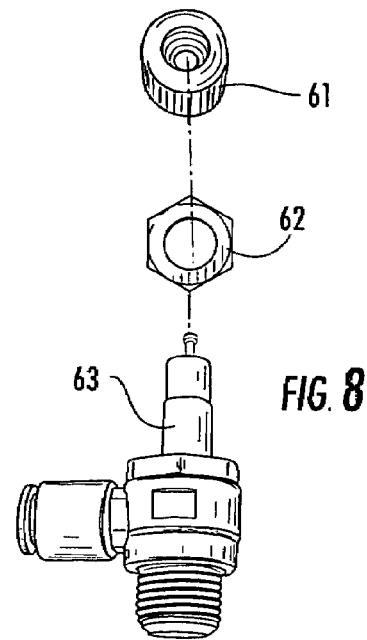
Figure 9:
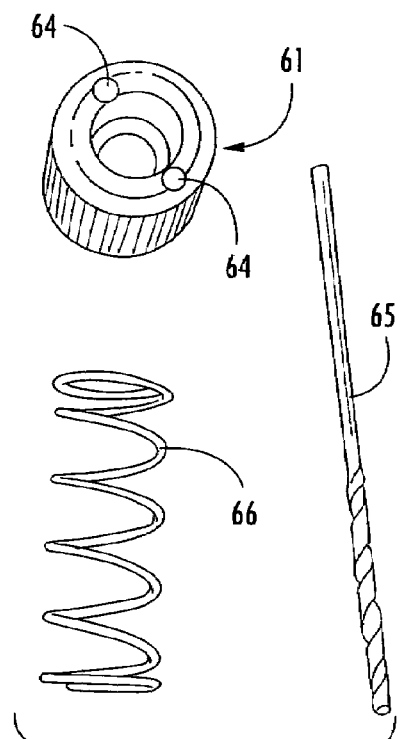
Figure 10:
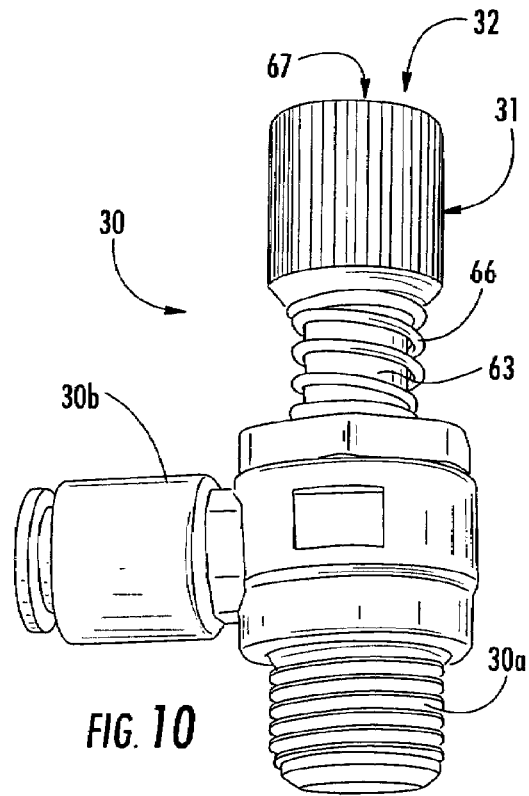

As mentioned above, a preferred valve 30 may be provided by modification of a stock valve. In this regard, FIG. 7 shows a stock valve 60, which is a flow controller available under part #AS2211FE-02-DPJ00026 from SMC Corporation of America. The valve 60 includes a rotatable knob 61 and a lock-nut 62 located on a shaft 63. To modify the valve 60 to provide the valve 30, the knob 61 and the nut 62 are first removed, as seen in FIG. 8. Next, as seen in FIG. 9, relief ports 64 are drilled into the bottom of the knob 61 using a drill bit 65. The bit 65 is preferably a 1/16 inch drill bit. Also, a stainless steel spring 66 is provided. The spring 66 and the thus modified knob 61 are then pressed back onto the shaft 63, and a vinyl cap 67 is pressed onto the top of the modified knob 61 to inhibit debris from entering and to provide the cap 31 having the vent 32.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A ride control system for a motorcycle having an oil-containing fork having an air space, the control system comprising a control unit having a reservoir and a valve in flow communication with the air space of the fork and the reservoir, wherein the valve is configured to enable air to substantially freely pass from the air space of the fork to the reservoir during a relatively low speed impact experienced by the fork, and to inhibit air from passing from the air space of the fork to the reservoir during a relatively high speed impact.

2. The system of claim 1, wherein the valve is adjustable.

3. The system of claim 1, further comprising an oil return assembly located within the control unit, the oil return assembly including a conduit for conducting oil from the reservoir to the fork via the valve when a negative pressure is applied to the valve by the fork during a rebound stroke of the fork subsequent to a high or low speed impact.

4. The system of claim 1, wherein the reservoir has a volume of about 50 cc.

5. The system of claim 1, wherein the valve is configured so as to not restrict the flow of air from the reservoir to the air space of the fork.

6. The system of claim 1, further comprising a vent in flow communication with the reservoir for venting pressurized air from the reservoir.

7. A ride control system, comprising:
an oil-containing fork having an air space and configured to compress during impact events;
a control unit having a reservoir discrete from the air space; and
a valve in flow communication with the air space of the fork and the reservoir,
wherein during a first impact event the fork compresses a first amount so as to force air from the air space toward the valve and the valve enables the air to substantially freely pass from the air space of the fork to the reservoir in response to the first impact event, and
wherein during a second impact event the fork compresses a second amount greater than the first amount so as to force air from the air space toward the valve and the valve substantially inhibits the air from passing from the air space of the fork to the reservoir in response to the second impact event.

8. The system of claim 7, wherein the valve is adjustable.

9. The system of claim 7, further comprising an oil return assembly located within the control unit, the oil return assembly including a conduit for conducting oil from the reservoir to the fork via the valve when a negative pressure is applied to the valve by the fork during a rebound stroke of the fork subsequent to a high or low speed impact.

10. A vehicle, comprising:
an oil-containing fork having first and second discrete air spaces and configured to compress during impact events;
a first control unit having a first reservoir discrete from the first air space;
a first valve in flow communication with the first air space of the fork and the first reservoir,
a second control unit having a second reservoir discrete from the second air space;
a second valve in flow communication with the second air space of the fork and the second reservoir,
wherein during a first impact event the fork compresses a first amount so as to force air from the first and second air spaces toward the first and second valves and the first and second valves enable the air to substantially freely pass from the first and second air spaces of the fork to the first and second reservoirs in response to the first impact event, and
wherein during a second impact event the fork compresses a second amount greater than the first amount so as to force air from the first and second air spaces toward the first and second valves and the first and second valves substantially inhibit the air from passing from the first and second air spaces of the fork to the first and second reservoirs in response to the second impact event.

11. The vehicle of claim 10, further comprising a conduit extending between the first and second reservoirs for placing the reservoirs in substantially unrestricted flow communication with one another so as to enable pressure equalization therebetween.

* * * * *